(12) United States Patent
Cheng

(10) Patent No.: US 10,739,547 B2
(45) Date of Patent: Aug. 11, 2020

(54) JOINING MECHANISM

(71) Applicant: TDK TAIWAN CORP., Yangmei Taoyuan (TW)

(72) Inventor: Wei-Shiang Cheng, Yangmei Taoyuan (TW)

(73) Assignee: TDK TAIWAN CORP., Yangmei Taoyuan (TW)

( * ) Notice: Subject to any disclaimer, the term of this patent is extended or adjusted under 35 U.S.C. 154(b) by 340 days.

(21) Appl. No.: 15/917,034

(22) Filed: Mar. 9, 2018

(65) Prior Publication Data

US 2018/0348468 A1 Dec. 6, 2018

(30) Foreign Application Priority Data

May 31, 2017 (CN) .................... 2017 2 0621880 U

(51) Int. Cl.
| | | |
|---|---|---|
| *G02B 7/02* | (2006.01) | |
| *G02B 27/64* | (2006.01) | |
| *H04N 5/225* | (2006.01) | |
| *G02B 27/02* | (2006.01) | |
| *H04N 5/232* | (2006.01) | |

(52) U.S. Cl.
CPC ............. *G02B 7/023* (2013.01); *G02B 27/02* (2013.01); *G02B 27/646* (2013.01); *H04N 5/2254* (2013.01); *H04N 5/2257* (2013.01); *G03B 2205/0007* (2013.01); *H04N 5/23287* (2013.01)

(58) Field of Classification Search
CPC ...... G02B 7/023; G02B 27/02; G02B 27/646; G02B 7/026; G02B 27/62; H04N 5/2254; H04N 5/2257; H04N 5/23287; H04N 5/22541; G03B 2205/0007
USPC .......................................... 359/819; 396/529
See application file for complete search history.

(56) References Cited

U.S. PATENT DOCUMENTS

| | | | | |
|---|---|---|---|---|
| 2010/0014176 A1* | 1/2010 | Wang | .................. | H02K 41/0356 359/822 |
| 2011/0262122 A1* | 10/2011 | Minamisawa | ........... | G03B 5/00 396/55 |
| 2015/0336211 A1* | 11/2015 | Watanabe | .............. | B23K 26/20 359/813 |

* cited by examiner

*Primary Examiner* — George G King
(74) *Attorney, Agent, or Firm* — Muncy, Geissler, Olds & Lowe, P.C.

(57) ABSTRACT

A joining mechanism is for movably connecting a base with a lens unit of a camera module. The lens unit includes a supporting member and a frame, and the supporting member supports an optical lens. The joining mechanism includes a spring sheet and a resilient member. The spring sheet is connected to the supporting member and the frame, and the resilient member is connected to the base and the spring sheet. The spring sheet includes an L-shaped structure which has a first section that extends along a first axis direction and a second section that extends along a second axis direction. The first section has a first recessed structure and a second recessed structure which extend along the second axis direction. The resilient member is affixed to the first recessed structure, and the first recessed structure is disposed between the second recessed structure and the second section.

17 Claims, 3 Drawing Sheets

JOINING MECHANISM

CROSS REFERENCE TO RELATED APPLICATIONS

This application claims priority of China Patent Application No. 201720621880.3, filed May 31, 2017, the entirety of which is incorporated by reference herein.

BACKGROUND OF THE DISCLOSURE

Field of the Disclosure

The present disclosure relates to a joining mechanism, and more particularly to a joining mechanism which is applied to a camera module.

Description of the Related Art

As technology has progressed, many kinds of electronic devices such as smart phones have begun to include the functionality of digital photography or video recording. A user can operate the electronic device to capture various images using the camera module of the electronic device, and therefore electronic devices equipped with camera modules have gradually become popular.

When a user uses an electronic device to take pictures, the hands of the user may shake, causing the picture to come out blurry. Therefore, more and more camera modules are designed to have the function of optical image stabilization (OIS). For example, there can be some elastic members disposed in the camera module, so that when the camera module is shaken, a supporting member for supporting an optical lens can move through the elastic members relative to a base of the camera module, so as to implement the function of optical image stabilization. However, a general elastic member is a metal spring sheet with a rectangular structure, and the corners of the rectangular structure may easily be damaged due to the stress concentration after the resilient member is bent many times.

Therefore, how to improve the service life and reliability of the members in a joining mechanism of a camera module are topics nowadays that need to be discussed and solved.

BRIEF SUMMARY OF THE DISCLOSURE

Accordingly, one objective of the present disclosure is to provide a joining mechanism installed in electronic devices, so as to solve the above problems.

According to some embodiments of the disclosure, a joining mechanism is provided for movably connecting a base and a lens unit of a camera module. The lens unit includes a supporting member and a frame, and the supporting member supports an optical lens. The joining mechanism includes a spring sheet and a resilient member with a longitudinal structure. The spring sheet is connected to the supporting member and the frame, and the resilient member is connected to the base and the spring sheet. The spring sheet includes an L-shaped structure, and the L-shaped structure has a first section substantially extended along a first axis direction and a second section substantially extended along a second axis direction. The first section has a first recessed structure and a second recessed structure which are extended along the second axis direction. The resilient member is affixed to the first recessed structure, and the first recessed structure is disposed between the second recessed structure and the second section.

In some embodiments, the first section further includes a first linearly extending structure which is extended along the first axis direction, and the second recessed structure includes a curved structure which is connected to the first linearly extending structure.

In some embodiments, the first section further includes a second linearly extending structure which is extended along the first axis direction, and the second linearly extending structure is connected to the first recessed structure and the second recessed structure.

In some embodiments, the first section further includes a third linearly extending structure for connecting the first recessed structure to the second section.

In some embodiments, the spring sheet further includes a connecting portion which is connected to the frame, the first linearly extending structure is connected to the second recessed structure and the connecting portion, and the second section is connected to the first section and the connecting portion.

In some embodiments, the first linearly extending structure includes an end portion which is connected to the connecting portion, a distance along the first axis direction is formed between the first recessed structure and the end portion, and the second section includes an extending length along the second axis direction, and the distance is less than the extending length.

In some embodiments, the first linearly extending structure includes a first linearly extending section, a second linearly extending section and a ramp section, wherein the ramp section is connected between the first linearly extending section and the second linearly extending section.

In some embodiments, a second width of the second linearly extending section along the second axis direction is greater than a first width of the first linearly extending section along the second axis direction.

In some embodiments, the first recessed structure includes a thickening portion and an opening, a central line of the opening is substantially parallel to the second axis direction, and the thickening portion is asymmetric relative to the central line.

In some embodiments, the first recessed structure includes a plane surface which faces the second section and is substantially parallel to the second axis direction.

In some embodiments, the second section includes a plurality of linearly extending sections, the linearly extending sections have different widths and are connected to each other, and the linearly extending sections are extended along the second axis direction.

In some embodiments, the spring sheet includes a rectangular structure, and the L-shaped structure is located on a corner of the spring sheet.

In some embodiments, the spring sheet includes a rectangular structure and four L-shaped structures, and the L-shaped structures are respectively located on four corners of the spring sheet.

In some embodiments, one end of the resilient member is connected to the L-shaped structure through a joining pad, and the other end of the resilient member is connected to the base through another joining pad.

In some embodiments, the joining pad is a metal solder or glue.

In some embodiments, the second section includes a third linearly extending section, a fourth linearly extending section and a ramp section, and the ramp section is connected between the third linearly extending section and the fourth linearly extending section.

In some embodiments, a fourth width of the fourth linearly extending section along the first axis direction is greater than a third width of the third linearly extending section along the first axis direction.

In conclusion, the present disclosure provides a joining mechanism for movably connecting a base and a lens unit of a camera module. The joining mechanism includes a spring sheet and four resilient members with longitudinal structures. The spring sheet includes a rectangular structure and four L-shaped structures, and the L-shaped structures are respectively located on four corners of the rectangular structure. The L-shaped structure includes a first section, a second section and a connecting portion. The first section includes a first recessed structure and a second recessed structure which are extended along the second axis direction, and the first recessed structure is configured to connect the resilient member. Based on the structural design of the first recessed structure and the second recessed structure, when the spring sheet is deformed, the problem of being damaged due to stress concentration can be prevented, so as to increase the reliability when the spring sheet is deformed.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

DETAILED DESCRIPTION OF THE ILLUSTRATIVE EMBODIMENTS

Figure 1:
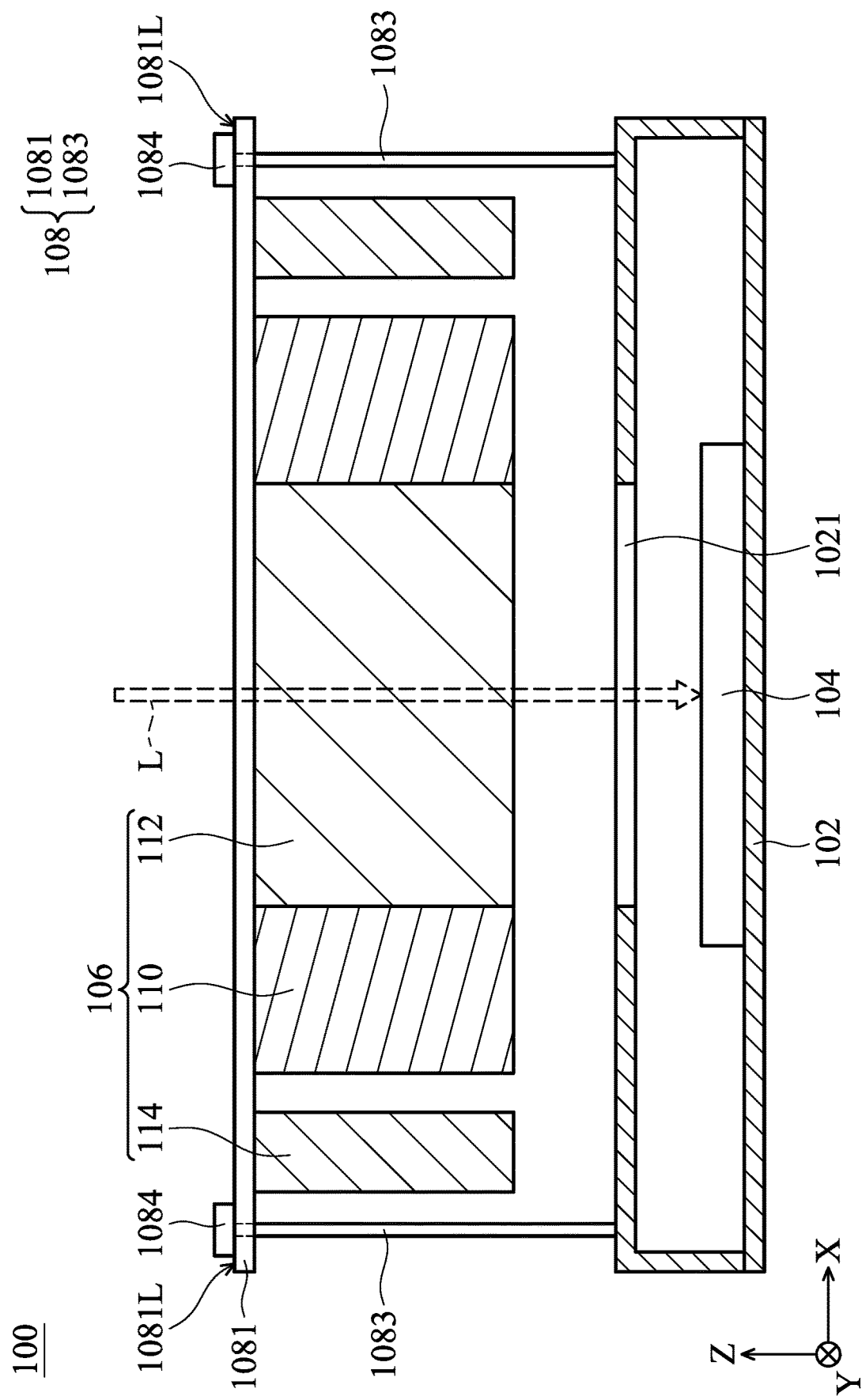
FIG. 1 shows a diagram of a camera module according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean+/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which shows a diagram of a camera module 100 according to an embodiment of the present disclosure. The camera module 100 can be a lens module which is installed in an electronic device or a portable electronic device. The camera module 100 is configured to capture images. For example, when a light beam L travels along the −Z-axis direction into a sensing unit 104 in the camera module 100, an image can be formed in the sensing unit 104 and then the sensing unit 104 can generate a digital image signal. After that, a processor or the electronic device or the portable electronic device can perform the image processing based on the digital image signal so as to obtain a final image which is provided for the user.

Figure 2:
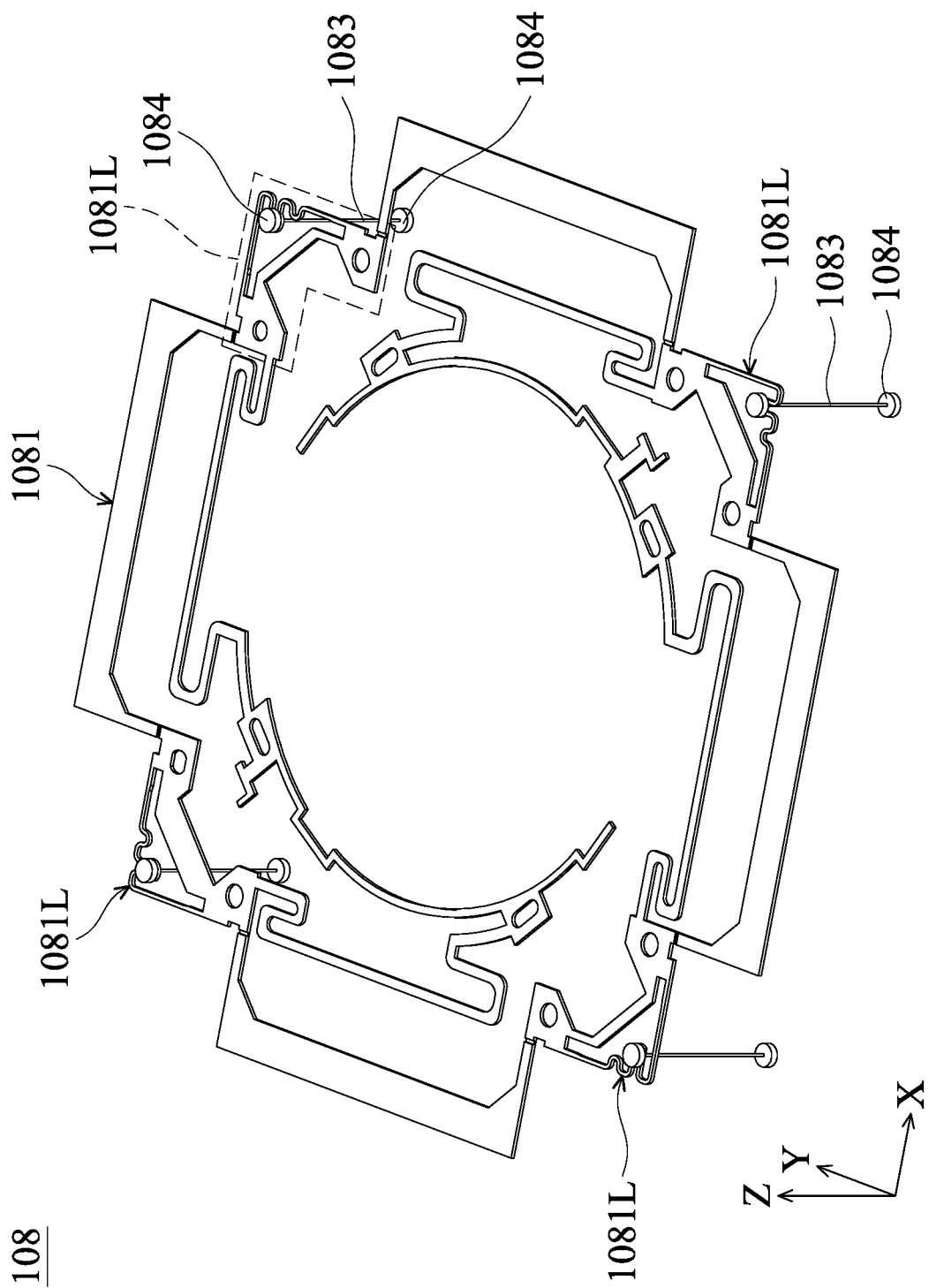
FIG. 2 shows a schematic diagram of the joining mechanism according to the embodiment of the present disclosure.

As shown in FIG. 1 and FIG. 2, the camera module 100 includes a base 102, a sensing unit 104, a lens unit 106 and a joining mechanism 108. The lens unit 106 includes a supporting member 110, an optical lens 112 and a frame 114, and the joining mechanism 108 includes at least one spring sheet 1081 and at least one resilient member 1083. The sensing unit 104 is disposed inside the base 102, and the sensing unit 104 is configured to receive the light beam L through an opening 1021 of the base 102, so as to generate a digital image signal. The supporting member 110 is configured to support the optical lens 112. For example, the optical lens 112 is disposed on the center of the supporting member 110, and the external light beam L travels through the optical lens 112 to be received by the sensing unit 104. The frame 114 is disposed to surround the supporting member 110. It should be noted that the supporting member 110, the optical lens 112 and the frame 114 in FIG. 1 are illustrated in a sectional view.

In this embodiment, the joining mechanism 108 includes one spring sheet 1081 and four resilient members 1083 (as shown in FIG. 2). The spring sheet 1081 is connected to the supporting member 110 and the frame 114. In particular, the frame 114 is affixed to L-shaped structures 1081L which are located on four corners of the spring sheet 1081. Each of the resilient members 1083 includes a longitudinal structure (or a long strip-shaped structure), such as a column-shaped structure or a line-shaped structure, but the shape of the resilient member 1083 is not limited thereto. The four resilient members 1083 are connected to the base 102 and the spring sheet 1081, and each of the resilient members 1083 is connected to the L-shaped structure 1081L of the spring sheet 1081 (as shown in FIG. 2). Based on the structural design, the supporting member 110 and the optical lens 112 can move along the Z-axis direction relative to the frame 114, so as to perform the auto-focusing function. In addition, the supporting member 110, the optical lens 112 and the frame 114 can move along the X-Y plane relative to the base 102 through the resilient members 1083, so as to achieve the purpose of optical image stabilization.

Please refer to FIG. 2, which shows a schematic diagram of the joining mechanism 108 according to the embodiment of the present disclosure. As shown in FIG. 2, the spring sheet 1081 is substantially a rectangular structure and includes four symmetric L-shaped structures 1081L which are located on four corners of the rectangular structure. One end of the resilient member 1083 is connected to the L-shaped structure 1081L through a joining pad 1084, and the other end of the resilient member 1083 is connected to the base 102 through another joining pad 1084 (as shown in FIG. 1). The joining pad 1084 can be a metal solder or glue, but it is not limited thereto.

Figure 3:
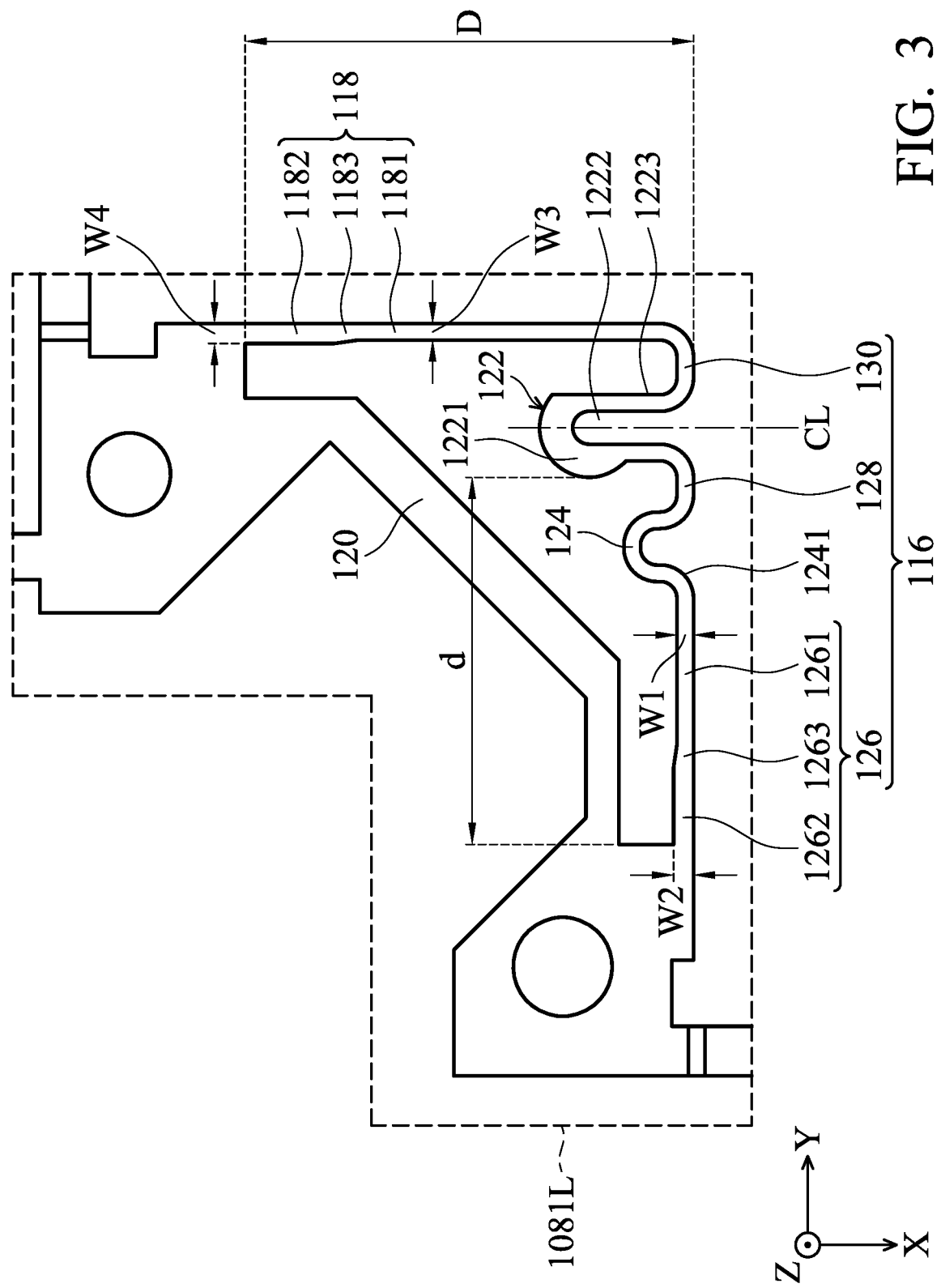
FIG. 3 shows a top view of the L-shaped structure according to the embodiment of the present disclosure.

Please refer to FIG. 3, which shows a top view of the L-shaped structure 1081L according to the embodiment of the present disclosure. As shown in FIG. 3, the L-shaped structure 1081L includes a first section 116 substantially extended along the Y-axis direction (a first axis direction) and a second section 118 substantially extended along the X-axis direction (a second axis direction). In addition, the L-shaped structure 1081L further includes a connecting portion 120 which is configured to connect the first section 116 and the second section 118, and the connecting portion 120 can be connected to the frame 114 in FIG. 1 through screws or glue. As shown in FIG. 3, the first section 116 has a first recessed structure 122 and a second recessed structure 124 which are extended along the −X-axis direction (or extended toward the connecting portion 120), and the resilient member 1083 is affixed to the first recessed structure 122. For example, the resilient member 1083 is affixed to the first recessed structure 122 through solder or glue. In this embodiment, the first recessed structure 122 is located between the second recessed structure 124 and the second section 118.

In addition, the first section 116 further includes a first linearly extending structure 126 which is extended along the Y-axis direction (the first axis direction), and the second recessed structure 124 includes a curved structure 1241. One end of the first linearly extending structure 126 is connected to the curved structure 1241 of the second recessed structure 124, and the other end of the first linearly extending structure 126 is connected to the connecting portion 120. More specifically, the first linearly extending structure 126 can include a first linearly extending section 1261, a second linearly extending section 1262 and a ramp section 1263. The ramp section 1263 is connected between the first linearly extending section 1261 and the second linearly extending section 1262, and a second width W2 of the second linearly extending section 1262 along the X-axis direction is greater than a first width W1 of the first linearly extending section 1261 along the X-axis direction.

Moreover, the first section 116 further includes a second linearly extending structure 128 and a third linearly extending structure 130 which are extended along the Y-axis direction (the first axis direction). The second linearly extending structure 128 is configured to connect the first recessed structure 122 and the second recessed structure 124, and the third linearly extending structure 130 is configured to connect the first recessed structure 122 and the second section 118.

The second section 118 can include a plurality of linearly extending sections, the linearly extending sections have different widths and are connected to each other, and the linearly extending sections are extended along the X-axis direction (the second axis direction). In this embodiment, the second section 118 includes a third linearly extending section 1181, a fourth linearly extending section 1182 and a ramp section 1183. The ramp section 1183 is connected between the third linearly extending section 1181 and the fourth linearly extending section 1182, and a fourth width W4 of the fourth linearly extending section 1182 along the Y-axis direction is greater than a third width W3 of the third linearly extending section 1181 along the Y-axis direction.

In this embodiment, the first recessed structure 122 includes a thickening portion 1221 and an longitudinal opening 1222. The opening 1222 is configured to accommodate the resilient member 1083, and the opening 1222 can define a central line CL. The central line CL is substantially parallel to the X-axis direction (the second axis direction), and the first recessed structure 122 is asymmetric relative to the central line CL. In addition, the first recessed structure 122 further includes a plane surface 1223 which faces the second section 118 and is substantially parallel to the X-axis direction (the second axis direction). Based on the asymmetric design of the thickening portion 1221 formed on the thickening portion 1221, the distance between the second section 118 and the central line CL of the first recessed structure 122 along the Y-axis direction can be reduced, and the structural strength of the first recessed structure 122 can remain strong as well to prevent from being fractured. Therefore, it can achieve the purpose of the miniaturization of the camera module 100.

It should be noted that a distance d along the Y-axis direction (the first axis direction) is formed between the first recessed structure 122 and an end portion of the first linearly extending structure 126, and the second section 118 includes an extending length D along the X-axis direction (the second axis direction). In this embodiment, The distance d is less than the extending length D.

In conclusion, the present disclosure provides a joining mechanism for movably connecting a base and a lens unit of a camera module. The joining mechanism includes a spring sheet and four resilient members with longitudinal structures. The spring sheet includes a rectangular structure and four L-shaped structures, and the L-shaped structures are respectively located on four corners of the rectangular structure. The L-shaped structure includes a first section, a second section and a connecting portion. The first section includes a first recessed structure and a second recessed structure which are extended along the second axis direction, and the first recessed structure is configured to connect the resilient member. Based on the structural design of the first recessed structure and the second recessed structure, when the spring sheet is deformed, the problem of being damaged due to stress concentration can be prevented, so as to increase the reliability when the spring sheet is deformed.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A joining mechanism for movably connecting a base with a lens unit of a camera module, wherein the lens unit comprises a supporting member and a frame, the supporting member supports an optical lens, and the joining mechanism comprises:
- a spring sheet, connected to the supporting member and the frame of the lens unit; and
- a resilient member with a longitudinal structure, connected to the base and the spring sheet wherein the base comprises a sensing unit which generates a digital image;
- wherein the spring sheet includes an L-shaped structure, and the L-shaped structure has a first section substantially extended along a first axis direction and a second section substantially extended along a second axis direction, wherein the first section has a first recessed structure and a second recessed structure which are extended along the second axis direction, the resilient member is affixed to the first recessed structure, and the first recessed structure is disposed between the second recessed structure and the second section.

2. The joining mechanism as claimed in claim 1, wherein the first section further includes a first linearly extending structure which is extended along the first axis direction, and the second recessed structure includes a curved structure which is connected to the first linearly extending structure.

3. The joining mechanism as claimed in claim 2, wherein the first section further includes a second linearly extending structure which is extended along the first axis direction, and the second linearly extending structure is connected to the first recessed structure and the second recessed structure.

4. The joining mechanism as claimed in claim 3, wherein the first section further includes a third linearly extending structure for connecting the first recessed structure to the second section.

5. The joining mechanism as claimed in claim 2, wherein the spring sheet further includes a connecting portion which is connected to the frame, the first linearly extending structure is connected to the second recessed structure and the connecting portion, and the second section is connected to the first section and the connecting portion.

6. The joining mechanism as claimed in claim 5, wherein the first linearly extending structure includes an end portion which is connected to the connecting portion, a distance along the first axis direction is formed between the first recessed structure and the end portion, and the second section includes an extending length along the second axis direction, and the distance is less than the extending length.

7. The joining mechanism as claimed in claim 2, wherein the first linearly extending structure includes a first linearly extending section, a second linearly extending section and a ramp section, wherein the ramp section is connected between the first linearly extending section and the second linearly extending section.

8. The joining mechanism as claimed in claim 7, wherein a second width of the second linearly extending section along the second axis direction is greater than a first width of the first linearly extending section along the second axis direction.

9. The joining mechanism as claimed in claim 1, wherein the first recessed structure includes a thickening portion and an opening, a central line of the opening is substantially parallel to the second axis direction, and the thickening portion is asymmetric relative to the central line.

10. The joining mechanism as claimed in claim 1, wherein the first recessed structure includes a plane surface which faces the second section and is substantially parallel to the second axis direction.

11. The joining mechanism as claimed in claim 1, wherein the second section includes a plurality of linearly extending sections, the linearly extending sections have different widths and are connected to each other, and the linearly extending sections are extended along the second axis direction.

12. The joining mechanism as claimed in claim 1, wherein the spring sheet includes a rectangular structure, and the L-shaped structure is located on a corner of the spring sheet.

13. The joining mechanism as claimed in claim 1, wherein the spring sheet includes a rectangular structure and four L-shaped structures, and the L-shaped structures are respectively located on four corners of the spring sheet.

14. The joining mechanism as claimed in claim 1, wherein one end of the resilient member is connected to the L-shaped structure through a joining pad, and the other end of the resilient member is connected to the base through another joining pad.

15. The joining mechanism as claimed in claim 14, wherein the joining pad is a metal solder or glue.

16. The joining mechanism as claimed in claim 1, wherein the second section includes a third linearly extending section, a fourth linearly extending section and a ramp section, and the ramp section is connected between the third linearly extending section and the fourth linearly extending section.

17. The joining mechanism as claimed in claim 16, wherein a fourth width of the fourth linearly extending section along the first axis direction is greater than a third width of the third linearly extending section along the first axis direction.

* * * * *